(12) United States Patent
Al-Aqeeli et al.

(10) Patent No.: US 8,853,303 B2
(45) Date of Patent: Oct. 7, 2014

(54) RECYCLED CRUMB RUBBER COATING

(75) Inventors: Nasser Al-Aqeeli, Dhahran (SA);
Hamoud M. Assehdi Al Hajri,
Al-Khobar (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 131 days.

(21) Appl. No.: 13/532,533

(22) Filed: Jun. 25, 2012

(65) Prior Publication Data

US 2013/0345339 A1    Dec. 26, 2013

(51) Int. Cl.
*C08K 5/00* (2006.01)
*C08L 71/02* (2006.01)

(52) U.S. Cl.
USPC .......................................... 523/456; 525/187

(58) Field of Classification Search
CPC .............................. C08L 63/00; C09D 163/00
USPC .......................................... 525/187; 523/456
See application file for complete search history.

(56) References Cited

U.S. PATENT DOCUMENTS

| | | | |
|---|---|---|---|
| 3,894,686 A * | 7/1975 | Weinberg et al. ................. | 238/8 |
| 5,106,554 A | 4/1992 | Drews | |
| 5,258,222 A * | 11/1993 | Crivelli ........................ | 428/323 |
| 5,397,825 A | 3/1995 | Segrest | |
| 5,883,182 A * | 3/1999 | Hunt .............................. | 524/525 |
| 5,969,053 A | 10/1999 | Bauman et al. | |
| 6,374,753 B1 | 4/2002 | Radke, Jr. | |
| 6,833,396 B2 | 12/2004 | Radke, Jr. | |
| 6,896,964 B2 | 5/2005 | Kvesic | |
| 2002/0149129 A1 * | 10/2002 | Radke, Jr. .................... | 264/122 |
| 2007/0101907 A1 | 5/2007 | Hellmann | |
| 2009/0326104 A1 | 12/2009 | Malboeuf et al. | |
| 2010/0009152 A1 * | 1/2010 | Lau et al. ..................... | 428/220 |
| 2010/0204404 A1 | 8/2010 | Hongo | |

FOREIGN PATENT DOCUMENTS

| WO | WO 2006/107190 A1 | 10/2006 |
|---|---|---|
| WO | WO 2007/025389 A1 | 3/2007 |

OTHER PUBLICATIONS

Mathew et al., "Epoxy resin/liquid natural rubber system: secondary phase separation and its impact on mechanical properties", *Journal of Materials Science*, vol. 45, No. 7, pp. 1769-1781, Jan. 20, 2010.
Sipahi-Saglam et al., "Studies on epoxy modified with recycled rubber", *Polymer Engineering & Science*, vol. 41, Issue 3, pp. 514-521, Mar. 2001.

* cited by examiner

*Primary Examiner* — Mark Eashoo
*Assistant Examiner* — Megan McCulley
(74) *Attorney, Agent, or Firm* — Richard C. Litman

(57) ABSTRACT

The recycled crumb rubber coating is a corrosion-proof coating for piping and the like. The coating is formed from recycled crumb rubber mixed with an epoxy resin and a hardener. Crumb rubber is first mixed with a liquid epoxy resin. An agent for reducing the viscosity of the liquid epoxy resin may also be added. A hardener is then added to this mixture. Finally, powdered crumb rubber is added and mixed to form the recycled crumb rubber coating. The total crumb rubber forms about 23 wt % of the coating. If no viscosity reducing agent is added, then the liquid epoxy resin forms about 51.6 wt % of the coating. If the viscosity reducing agent is added, then the liquid epoxy resin forms about 50.1 wt % of the coating, and the viscosity reducing agent forms about 1.5 wt % of the coating. The hardener forms about 25.4 wt % of the coating.

19 Claims, No Drawings

RECYCLED CRUMB RUBBER COATING

BACKGROUND OF THE INVENTION

1. Field of the Invention

The present invention relates generally to corrosion-proof coatings for piping and the like, and particularly to a recycled crumb rubber coating formed from recycled crumb rubber mixed with an epoxy resin and a hardener.

2. Description of the Related Art

Crumb rubber is a type of rubber material, typically extracted from automotive and truck scrap tires. During the recycling process, steel and fluff is removed, leaving tire rubber with a granular consistency. Continued processing with a granulator and/or cracker mill, often with the aid of cryogenics or mechanical means, reduces the size of the particles further. The particles are sized and classified based on various criteria, such as color ("black only" or "black and white"). The granulate is sized by passing it through a screen. The size is based on the dimension of the screen or on its mesh. Although recycling of scrap tires is highly desirable, the uses of crumb rubber have, thus far, been fairly limited. Crumb rubber is primarily used in artificial turf as cushioning, where it is sometimes referred to as "astro-dirt". Given the large volume of scrap tires around the world, and the need to conserve natural resources, as well as reducing pollutants, it would be desirable to provide further recycling uses for crumb rubber.

Typical commercially available coating products for piping and the like are either relatively hard, such as conventional epoxies and polyurethanes, or relatively expensive and difficult to apply, such as polysulfide and polyurea. Further, even the flexible, modified epoxies and polyurethanes lose their flexibility quickly as time elapses. It would be desirable to provide a flexible industrial coating for the protection of steel and concrete structures exposed to water and industrial chemicals, and to further provide such a coating which could utilize recycled crumb rubber.

Thus, a recycled crumb rubber coating solving the aforementioned problems is desired.

SUMMARY OF THE INVENTION

The recycled crumb rubber coating is a corrosion-proof coating for piping and the like. The coating is formed from recycled crumb rubber mixed with an epoxy resin and a hardener. The crumb rubber is first mixed with a liquid epoxy resin. An agent for reducing the viscosity of the liquid epoxy resin, such as benzyl alcohol, may also be added, A hardener is then added to this mixture. Finally, powdered crumb rubber is added and mixed to form the recycled crumb rubber coating. The total crumb rubber forms about 23 wt % of the recycled crumb rubber coating. If no viscosity reducing agent is added, then the liquid epoxy resin forms about 51.6 wt % of the recycled crumb rubber coating. If the viscosity reducing agent is added, then the liquid epoxy resin forms about 50.1 wt % of the recycled crumb rubber coating, and the viscosity reducing agent forms about 1.5 wt % of the recycled crumb rubber coating. The hardener forms about 25.4 wt % of the recycled crumb rubber coating.

These and other features of the present invention will become readily apparent upon further review of the following specification.

DETAILED DESCRIPTION OF THE PREFERRED EMBODIMENTS

The recycled crumb rubber coating is a corrosion-proof coating for piping and the like. The coating is formed from recycled crumb rubber mixed with an epoxy resin and a hardener. Crumb rubber is first mixed with a liquid epoxy resin. The liquid epoxy resin is preferably a mixture of bisphenol A, bisphenol F and epichlorohydrin, such as D.E.R. 351, manufactured by Dow Chemical® of Midland, Mich. It should be understood that any suitable type of liquid epoxy resin may be utilized. The crumb rubber and liquid epoxy resin are mixed for about one minute.

An agent for reducing the viscosity of the liquid epoxy resin, such as benzyl alcohol, may also be added. A hardener is then added to this mixture. The hardener is preferably an aliphatic polyamine hardener, such as Aradur® 2973, manufactured by Huntsman Advanced Materials of Switzerland. It should be understood that any suitable type of hardener may be utilized. The hardener, crumb rubber and liquid epoxy resin (and the viscosity reducing agent, if used) are stirred together for about three minutes.

Finally, powdered crumb rubber is added and mixed for about five minutes at atmospheric temperature to form the recycled crumb rubber coating. The total crumb rubber forms about 23 wt % of the recycled crumb rubber coating. If no viscosity reducing agent is added, then the liquid epoxy resin forms about 51.6 wt % of the recycled crumb rubber coating. If the viscosity reducing agent is added, then the liquid epoxy resin forms about 50.1 wt % of the recycled crumb rubber coating, and the viscosity reducing agent forms about 1.5 wt % of the recycled crumb rubber coating. The hardener forms about 25.4 wt % of the recycled crumb rubber coating.

The coating may then be applied to an external surface of a pipe, structural element, or the like by dipping, pouring, spraying, or by any other suitable method of application. The coating is preferably applied and then left for about three hours of drying. The coating is flexible, resistant to cracking, and forms a relatively large film thickness in a single coat. The coating is re-coatable, provides corrosion resistance against water and chemicals, has excellent mechanical and abrasion resistance, and a lifetime of about ten years or longer.

The recycled crumb rubber coating is relatively dark, forming a dark grey or black surface, and may be further coated with a thin (on the order of about 30-50 microns) layer of acrylic or polyurethane paint for decorative purposes. Similarly, the thin layer of acrylic or polyurethane paint may be applied for protection against ultraviolet degradation.

Samples coated with the present recycled crumb rubber coating were tested in a highly corrosive environment using both immersion and potentio-dynamic testing. The coating showed excellent resistance to corrosion after exposure. The coating is also found to have excellent adhesion.

It is to be understood that the present invention is not limited to the embodiments described above, but encompasses any and all embodiments within the scope of the following claims.

We claim:

1. A recycled crumb rubber coating composition, comprising:
    about 23 wt % crumb rubber;
    about 51.6 wt % liquid epoxy resin; and
    about 25.4 wt % epoxy hardener.
2. The recycled crumb rubber coating composition as recited in claim 1, wherein said liquid epoxy resin comprises a reaction mixture of bisphenol A, bisphenol F and epichlorohydrin.
3. The recycled crumb rubber coating composition as recited in claim 2, wherein said hardener comprises an aliphatic polyamine hardener.

4. The recycled crumb rubber coating composition as recited in claim 1, wherein said hardener comprises an aliphatic polyamine hardener.

5. The recycled crumb rubber coating composition as recited in claim 4, wherein said liquid epoxy resin comprises a reaction mixture of bisphenol A, bisphenol F and epichlorohydrin.

6. A recycled crumb rubber coating composition, comprising:
   about 23 wt % crumb rubber;
   about 50.1 wt % liquid epoxy resin;
   about 1.5 wt % of a viscosity reducing agent; and
   about 25.4 wt % epoxy hardener.

7. The recycled crumb rubber coating composition as recited in claim 6, wherein said liquid epoxy resin comprises a reaction mixture of bisphenol A, bisphenol F and epichlorohydrin.

8. The recycled crumb rubber coating composition as recited in claim 7, wherein said hardener comprises an aliphatic polyamine hardener.

9. The recycled crumb rubber coating composition as recited in claim 8, wherein said epoxy viscosity reducing agent comprises benzyl alcohol.

10. The recycled crumb rubber coating composition as recited in claim 6, wherein said hardener comprises an aliphatic polyamine hardener.

11. The recycled crumb rubber coating composition as recited in claim 10, wherein said liquid epoxy resin comprises a mixture of bisphenol A, bisphenol F and epichlorohydrin.

12. A method of making a recycled crumb rubber coating, comprising the steps of:
   mixing crumb rubber with a liquid epoxy resin to form a first mixture; and
   mixing the first mixture with a hardener to form the recycled crumb rubber coating;
   wherein the recycled crumb rubber coating comprises about 23 wt % crumb rubber, about 51.6 wt % liquid epoxy resin, and about 25.4 wt % epoxy hardener.

13. The method of making a recycled crumb rubber coating as recited in claim 12, further comprising the step of adding an epoxy viscosity reducing agent to the first mixture.

14. The method of making a recycled crumb rubber coating as recited in claim 13, wherein the step of adding the epoxy viscosity reducing agent to the first mixture comprises adding benzyl alcohol to the first mixture.

15. The method of making a recycled crumb rubber coating as recited in claim 12, wherein the step of mixing the crumb rubber with the liquid epoxy resin comprises mixing the crumb rubber with an epoxy resin comprising a reaction mixture of bisphenol A, bisphenol F and epichlorohydrin.

16. The method of making a recycled crumb rubber coating as recited in claim 15, wherein the step of mixing the first mixture with the hardener comprises mixing the first mixture with an aliphatic polyamine hardener.

17. The method of making a recycled crumb rubber coating as recited in claim 12, wherein the crumb rubber is mixed with the liquid epoxy resin for about one minute.

18. The method of making a recycled crumb rubber coating as recited in claim 17, wherein the step of mixing the first mixture with the hardener comprises stirring the first mixture and the hardener for about three minutes.

19. The method of making a recycled crumb rubber coating as recited in claim 18, further comprising the steps of:
   adding powdered crumb rubber after the step of mixing the hardener with the first mixture; and
   stirring the mixture for about five minutes after adding the powdered crumb rubber.

* * * * *